(12) United States Patent
Nyholm et al.

(10) Patent No.: US 12,449,840 B2
(45) Date of Patent: Oct. 21, 2025

(54) CASE FOR A TABLET SHAPED DEVICE

(71) Applicant: STM Management Pty Ltd, Alexandria NSW (AU)

(72) Inventors: Ethan Nyholm, Bondi Beach NSW (AU); Jacob Goodridge, Kelvin Grove QLD (AU)

(73) Assignee: STM Management Pty Ltd, Alexandria (AU)

( * ) Notice: Subject to any disclaimer, the term of this patent is extended or adjusted under 35 U.S.C. 154(b) by 539 days.

(21) Appl. No.: 17/721,261

(22) Filed: Apr. 14, 2022

(65) Prior Publication Data

US 2022/0236764 A1    Jul. 28, 2022

Related U.S. Application Data

(63) Continuation of application No. 16/779,292, filed on Jan. 31, 2020, now abandoned.

(30) Foreign Application Priority Data

Feb. 6, 2019 (AU) ................................ 2019100127

(51) Int. Cl.
G06F 1/16    (2006.01)

(52) U.S. Cl.
CPC .......... *G06F 1/1628* (2013.01); *G06F 1/1626* (2013.01)

(58) Field of Classification Search
CPC ...... G06F 1/1628; G06F 1/1626; G06F 1/166; G06F 1/1669; G06F 2200/1633; G06F 1/1656; H05K 5/0226; H05K 5/0204; H05K 5/0247; H05K 5/03; A45C 13/005; A45C 2011/003; A45C 11/003
See application file for complete search history.

(56) References Cited

U.S. PATENT DOCUMENTS

2019/0174893 A1 * 6/2019 Hemesath .............. A45C 11/00

* cited by examiner

*Primary Examiner* — Ankur Jain
(74) *Attorney, Agent, or Firm* — Christensen, Fonder, Dardi & Herbert PLLC; Andrew H. Auderieth

(57) ABSTRACT

A case for a tablet shaped device, comprising a first panel comprising a portion of a case perimeter wall; a second panel comprising another portion of the case perimeter wall, wherein the first panel and the second panel define a front face adjacent the case perimeter wall and having a tablet shaped device receiving area, the second panel comprising substantially one third of the tablet shaped device receiving area; and a hinge coupling the first panel and the second panel.

11 Claims, 7 Drawing Sheets

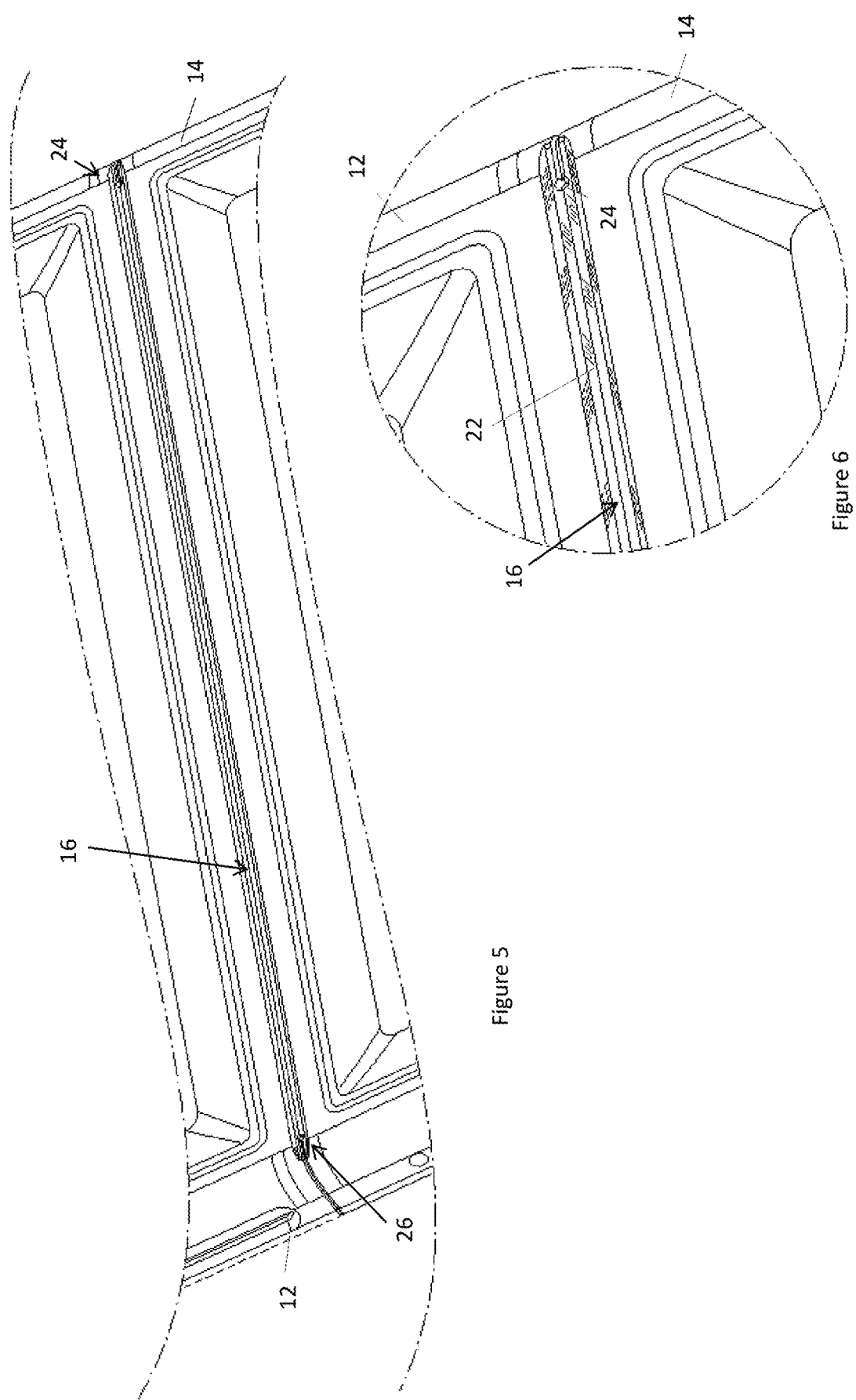

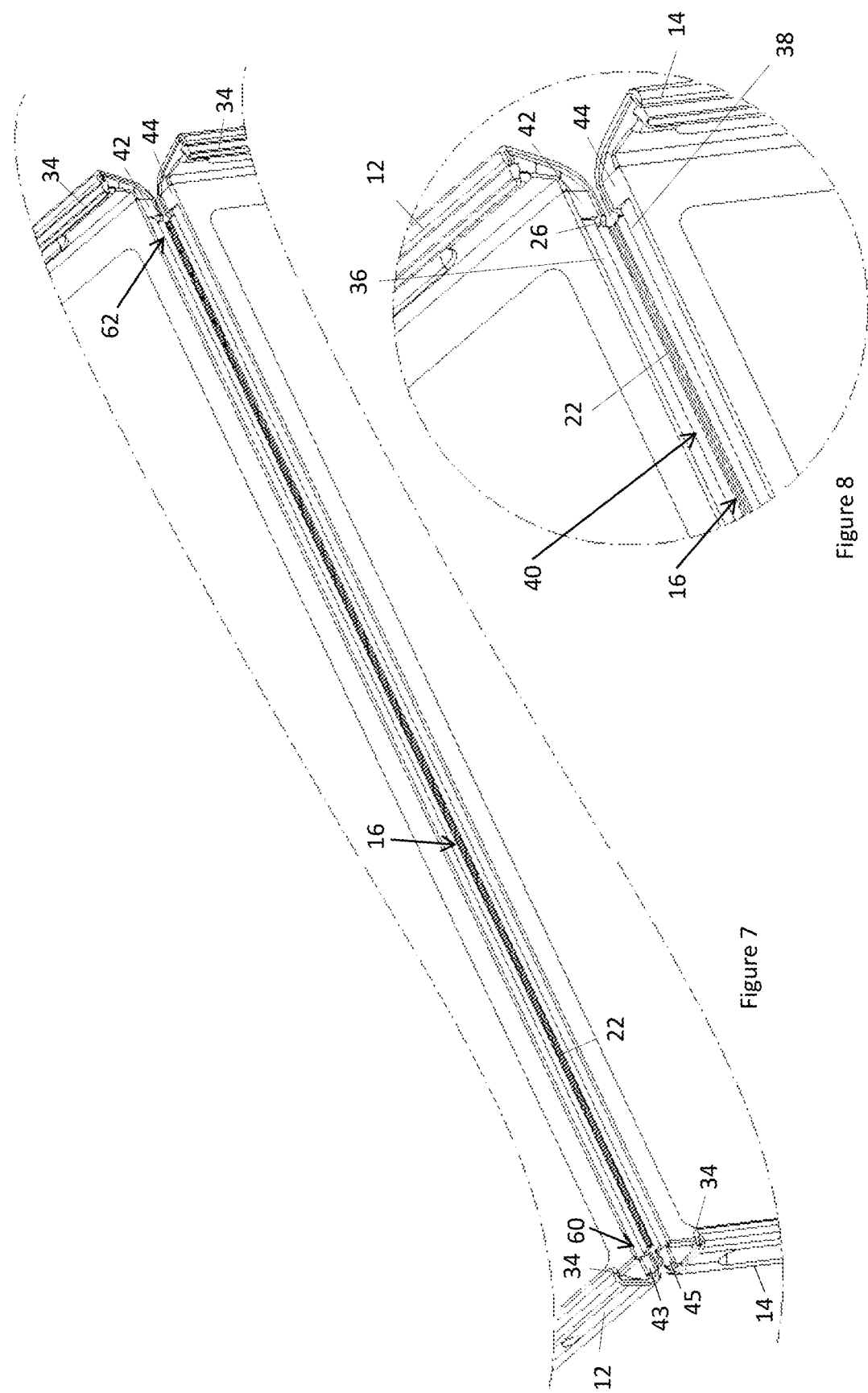

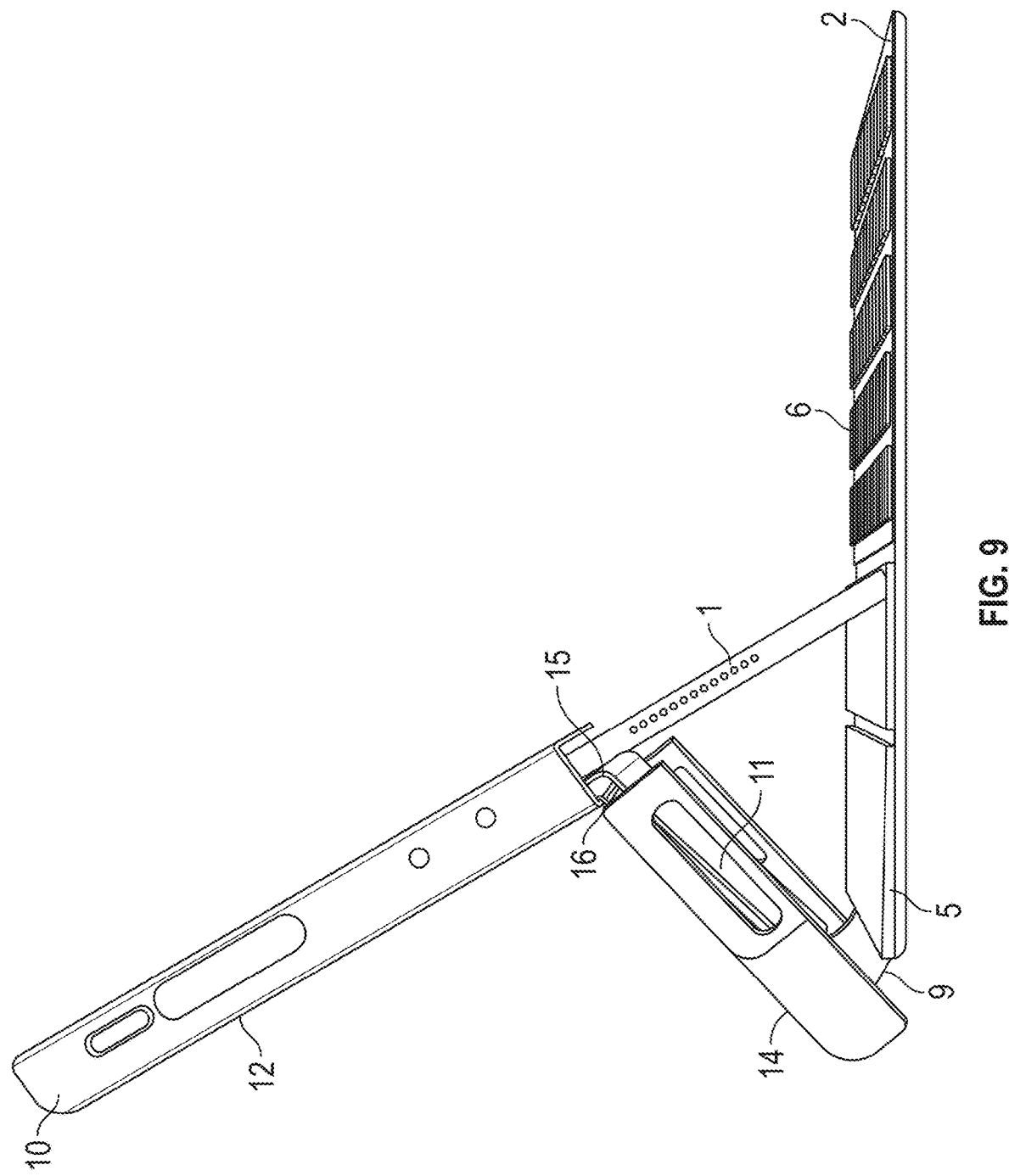

CASE FOR A TABLET SHAPED DEVICE

PRIORITY CLAIM

The present application is a continuation U.S. patent application Ser. No. 16/779,292, filed Jan. 31, 2020, which claims priority to Australia Patent Application No. 2019100127, filed on Feb. 6, 2019, which said applications are incorporated by reference in their entirety herein.

TECHNICAL FIELD

The disclosure herein generally relates to a case for a tablet shaped device.

BACKGROUND

Examples of tablet shaped devices include but are not limited to a tablet computer, an APPLE IPAD PRO™, SAMSUNG GALAXY TAB S4, and AMAZON FIRE HB 8. A peripheral keyboard may be used by a user to interface with a tablet shaped device. The peripheral keyboard may communicate with the tablet shaped device via a BLUETOOTH network, at least one port, or via a cable, for example.

FIG. 1 shows a tablet shaped device in the form of an APPLE IPAD PRO™ ("IPAD"), generally indicated by the numeral 1. The tablet shaped device 1 is coupled to a prior art folding cover 2 for a tablet shaped device ("folding cover"). The folding cover comprises a keyboard 6, and is in the form of an APPLE SMART KEYBOARD FOLIO™, however other examples of folding covers do not comprise a keyboard. Other folding covers with a keyboard may be used. The folding cover 2 attaches to the tablet shaped device 1 magnetically. In this but not all possible examples, a plurality of magnets are embedded within the back panel of the tablet shaped device 1 which are magnetically attracted to the folding cover 2. The folding cover 2 comprises a magnetically attractable material for magnetic attachment to the plurality of magnets. A port located on the back face of the tablet shaped device 1 in the form of an APPLE SMART CONNECTOR™ connects the folding cover 2 and the tablet shaped device 1. The port provides a data connection and power to the keyboard 6. Such ports may be located at other positions on other tablet shaped device, for example on an edge of a tablet shaped device.

In FIG. 1, the folding cover 2 is shown in a typing configuration. The folding cover 2 comprises a plurality of hingedly connected panels 5,11, that are sequentially connected. Panel 5 is hingedly connected to the keyboard 6. In the typing configuration, the plurality of hingedly connected panels 5,11 are folded behind the tablet shaped device 1 to form a collapsible stand 3. When the folding cover 2 is in the typing configuration, the front face 4 of the tablet shaped device 1, which comprises an electronic touch sensitive display 8, faces the user.

The folding cover 2 also has a tablet shaped device protection configuration, in which the keyboard 6 covers the front face 4 and electronic touch sensitive display 8 of the tablet shaped device 1 to provide light protection. In this configuration, the back of the tablet shaped device 1 is protected by the plurality of hingedly connected panels 5,11, the stand 3 being collapsed and flattened.

Some users may find the light protection configuration insufficient, particularly those users who wish to protect the table shaped device 1 from accidental drops, or who may use the tablet shaped device 1 in a harsh environment, e.g. a construction site, a school or in the field. In the past, those users may generally dispose the tablet shaped device in a prior art rugged case for a tablet shaped device that has a rear wall for protecting the back face of the tablet shaped device 1 and has a protecting peripheral wall for protecting the perimeter of the tablet shaped device 1. This may be problematic, however, because such a prior art rugged case may interfere with the folding cover 2, and interfere with during reconfiguration of the folding cover 2 between the typing configuration and the protection configuration. The tablet shaped device 1 may need to be removed from the prior art rugged case for reconfiguration of the folding cover 2.

Improved cases for tablet shaped devices may be desired, or there may be a desire for more consumer choice.

SUMMARY

Disclosed herein is a case for a tablet shaped device. The case comprises a first panel comprising a portion of a case perimeter wall. The case comprises a second panel comprising another portion of the case perimeter wall. The first panel and the second panel define a front face adjacent the case perimeter wall and having a tablet shaped device receiving area. The second panel comprises substantially one third of the tablet shaped device receiving area. The case comprises a hinge coupling the first panel and the second panel.

In an embodiment, the hinge attaches the first panel and the second panel.

In an embodiment, the hinge is configured for folding the second panel backwards.

In an embodiment, the hinge comprises a membrane and the first panel, the second panel and the membrane define a dovetail groove.

In an embodiment, the hinge comprises a membrane defining key-hole shaped apertures at either end thereof.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 5 shows a rear view detail of a hinge of the case of FIG. 2 in a closed configuration.

FIG. 6 shows a rear view detail of an end of the hinge in the closed configuration.

FIG. 7 shows a front view detail of the hinge in an open configuration.

FIG. 8 shows a front view detail of an end of the hinge in the open configuration.

FIG. 9 shows a side view of the case of FIG. 2 having receiving therein the folding cover of FIG. 1 and the tablet shaped device of FIG. 1.

DESCRIPTION OF EMBODIMENTS

Figure 1:
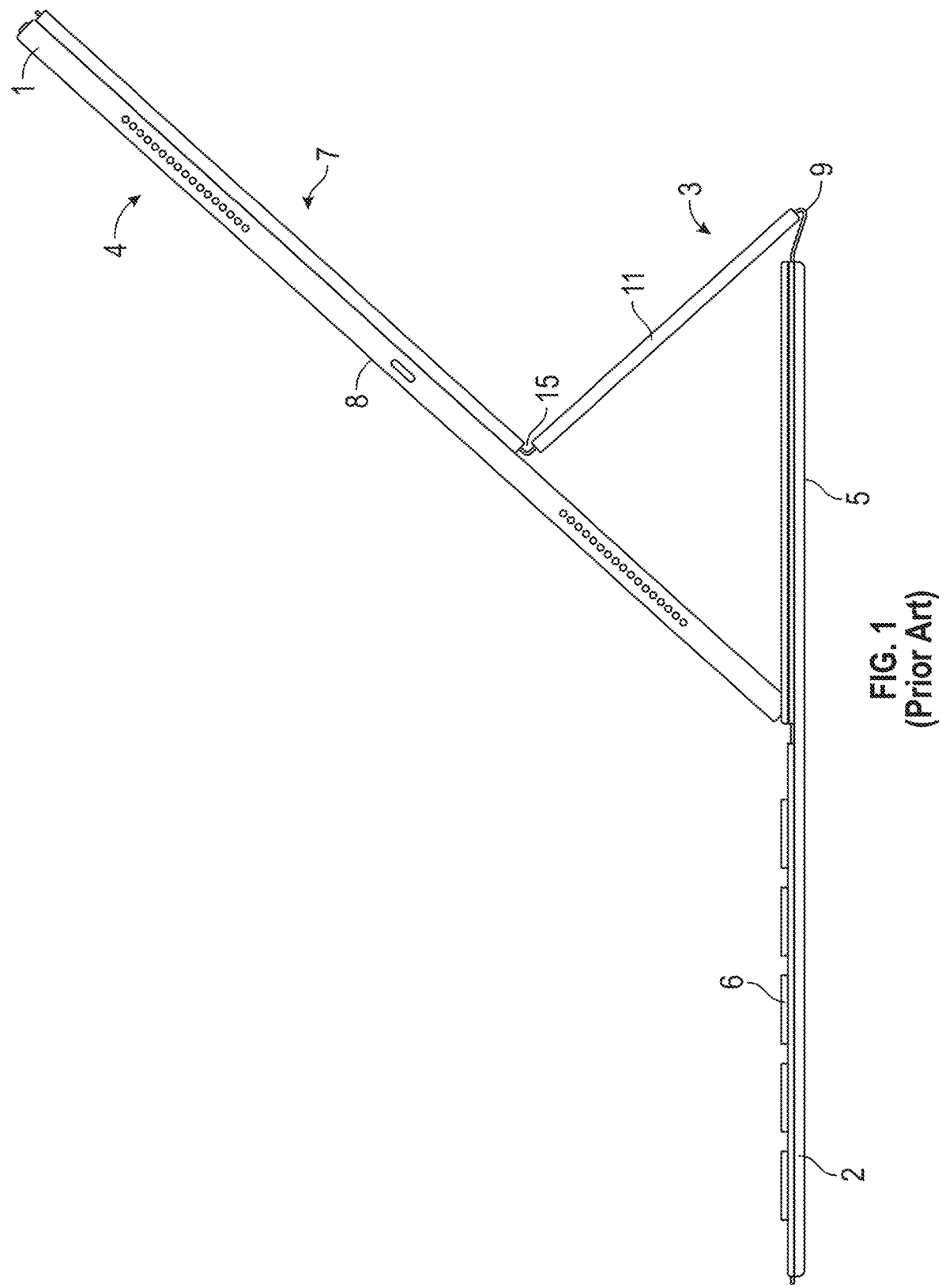
FIG. 1 shows a side perspective view of a prior art example of a folding cover for a tablet shaped device coupled to a tablet shaped device.
Figure 2:
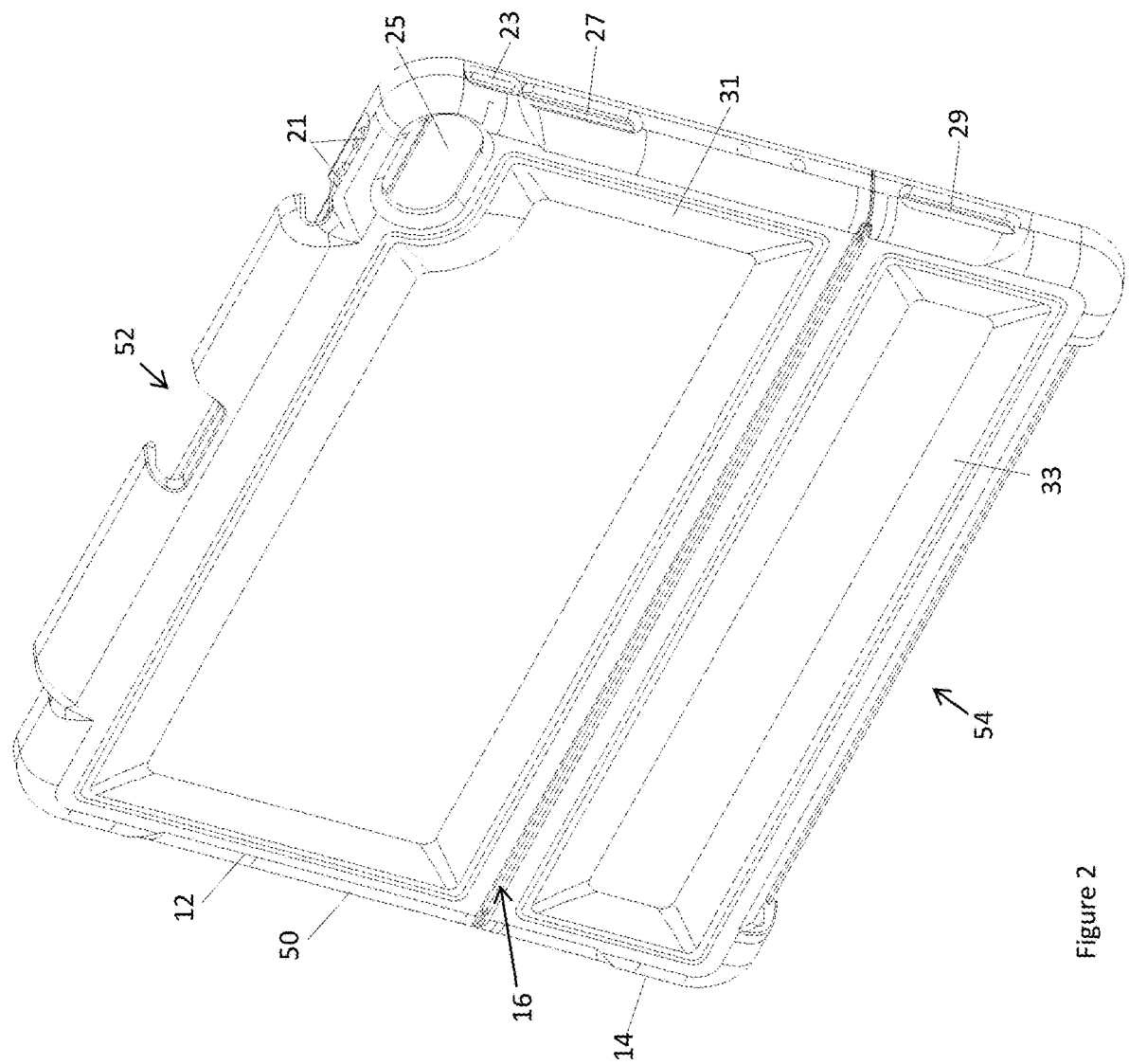
FIG. 2 shows a rear perspective view of an embodiment of a case for a tablet shaped device.
Figure 3:
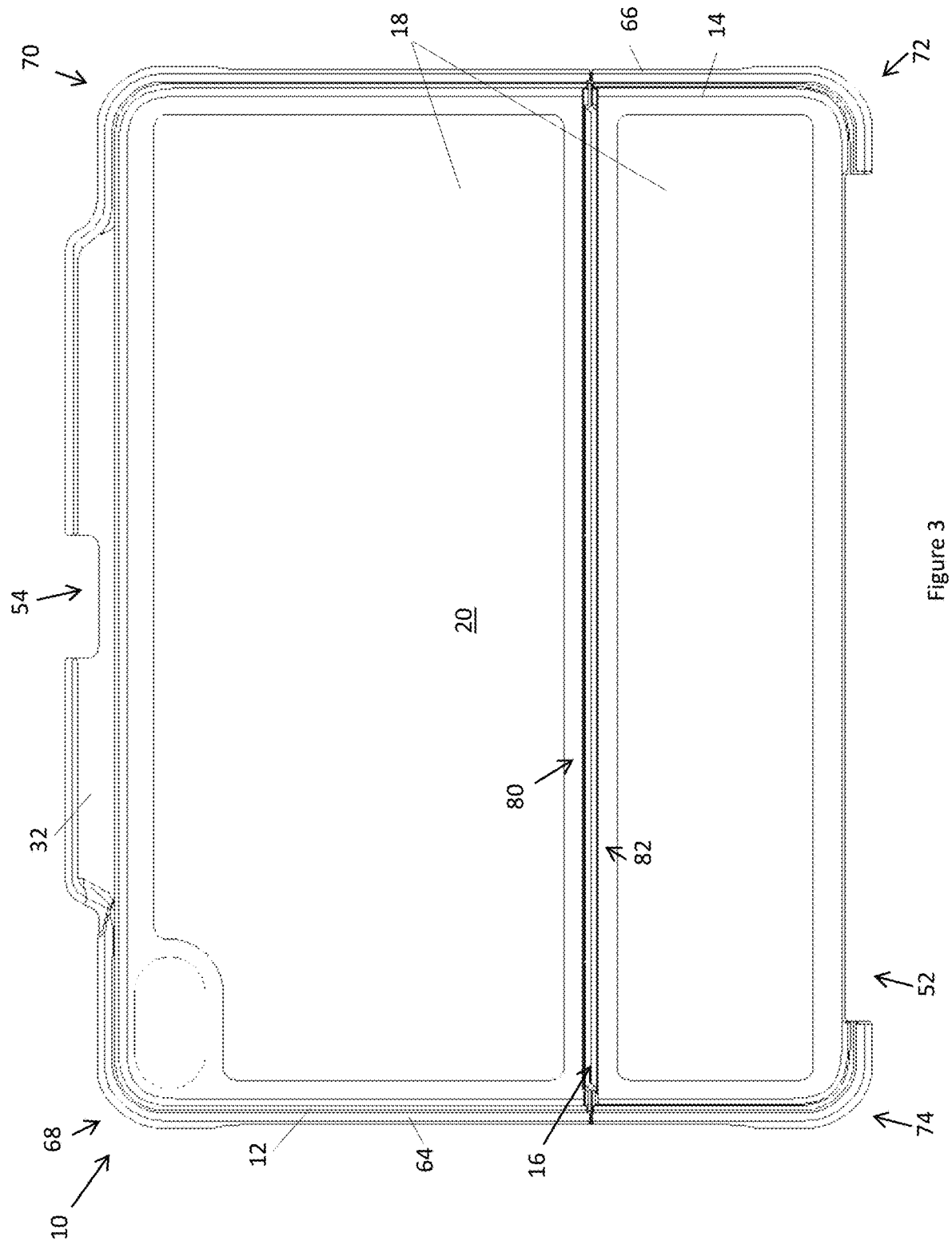
FIG. 3 shows a front view of the case of FIG. 2.
Figure 4:
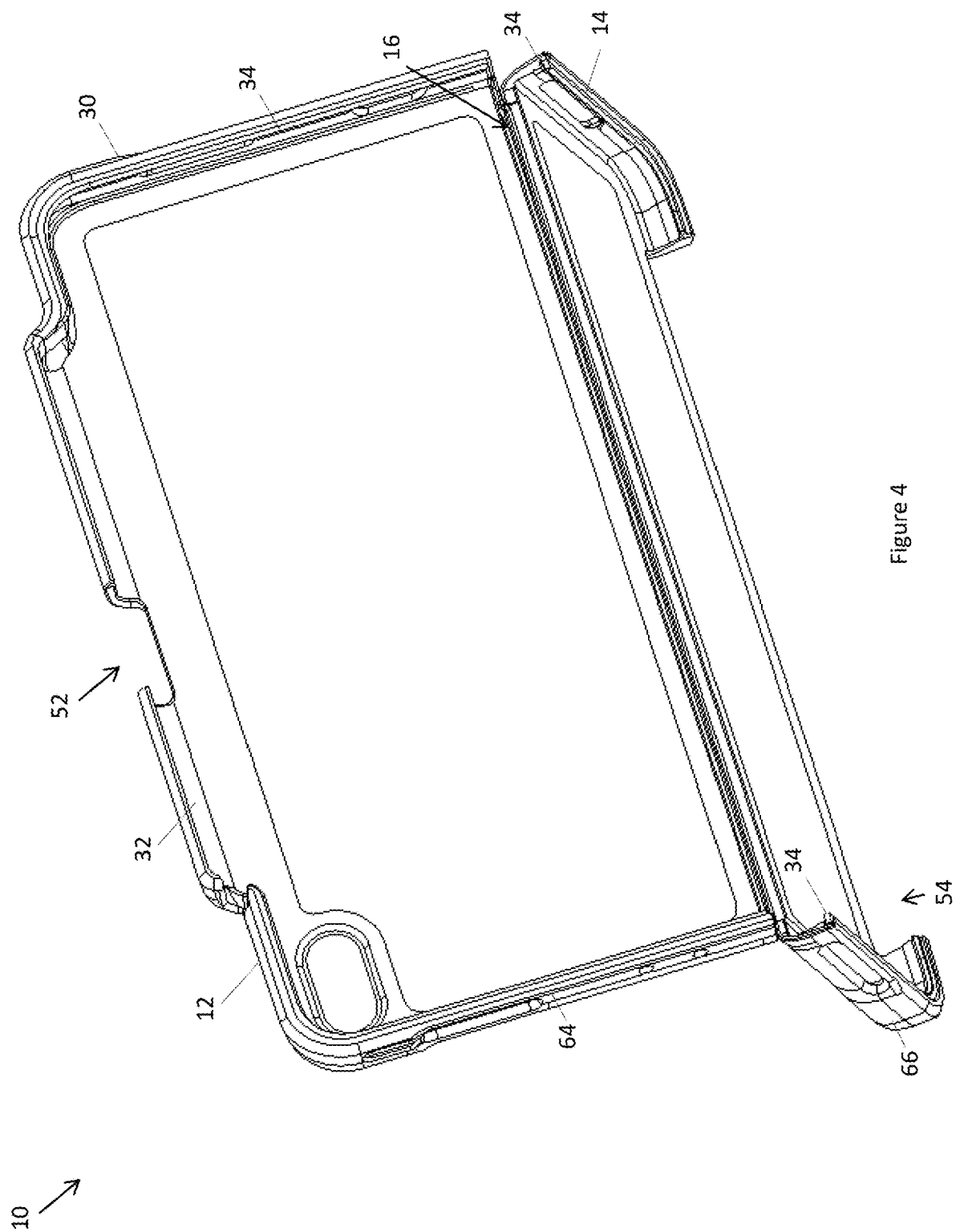
FIG. 4 shows a front perspective view of the case of FIG. 2, wherein a panel thereof is folded backwards.

FIGS. 2-9 show various representations of an embodiment of a case for a tablet shaped device, the case being generally indicated by the number 10. The case 10 comprises a first panel 12, a second panel 14, and a hinge 16 coupling the first panel 12 and the second panel 14. The first panel 12 and the second panel 14 define a front face 18 having a tablet shaped device receiving area 20. The first panel 12 and the send panel are each substantially rectangular and have distal rounded corners (68,70,72,72) ("partially rounded rectangle"). One rounded corner may be different to another rounded corner, as suitable and desired. As shown in FIGS. 3 and 4, the hinge 16 is configured for folding the second panel 14 backwards. Folding the second panel 14 backwards allows a folding cover 2 in the form of an APPLE SMART KEYBOARD FOLIO, or generally any suitable folding cover 2, to be configured in a typing configuration and coupled to the tablet shaped device 1 when received by the tablet shaped device receiving area 20, without the case 10 impeding the coupling between the tablet shaped device 1 and the folding cover 2. The case 10 is shown in a bent configuration in FIG. 4, for accommodating the folding cover 2 when in the typing configuration. The case 10 is shown in a flat configuration in FIGS. 2 and 3. The flat configuration provides more protection for the tablet shaped device when received by the case, however the flat configuration may not generally be employed when the folding cover's keyboard 6 is in use. The case 10 may not need to be separated from the tablet shaped device and folding cover 2 during reconfiguration of the folding cover 2 between the typing configuration and a protection configuration.

As shown in FIG. 9, for example, in use, the hinge 15 of the folding cover 2 that is out of the plane of the keyboard 6 is at the case's hinge 16, and parallel to it. To accommodate the folding cover 2 when in the typing configuration, the second panel 14 is smaller than the first panel 12. In the present embodiment, the second panel 14 comprises substantially one third of the area of the tablet shaped device receiving area 20. In the present embodiment, the second panel 14 comprises 0.3-0.37 of the area of the tablet shaped device receiving area 20. The first panel 12 comprises substantially two thirds of the tablet shaped device receiving area 20, in the present embodiment 0.63-0.7 of the tablet shaped device receiving area 20. A side 80 of the first panel 12 and a side 82 of the second panel 12, which is also substantially rectangular 72,74 and has two distal rounded corners, are at the hinge 16.

The hinge 16 attaches the first panel 12 and the second panel 14. The hinge 16 is integral with the first panel 12 and the second panel. As best seen in FIG. 6, the hinge 16 is in the form of a membrane hinge and comprises a membrane 22. In an alternative embodiment, the hinge 16 may comprise a hinge pin, or have generally any suitable constructions. A membrane hinge 16 may be easier to manufacture, for example when integral to the panels 12,14. As shown in FIG. 7, for example, the membrane 22 extends between opposite membrane ends 60, 62 which are adjacent associated sides of the case 10. The membrane 22 defines key-hole shaped apertures 24,26 at each end of the opposite membrane ends 60,62. The key-hole shapes apertures 24,26 may reduce stress within the hinge during folding. This may assist the hinge 16 to fold and improve the membrane's resilience to ripping.

As detailed in FIG. 8, each panel 12,14 comprises an edge 36,38 at the hinge 16. The edges 36,38 and the membrane 22 define a groove having a dovetail configuration ("dovetail groove"), generally located at 40, when the hinge 16 is closed. The membrane 22 is the end-wall of the dovetail cavity 40 and the flat edges 36,38 are the side walls of the dovetail cavity 40. The walls of the dovetail groove 40 may alternatively have curved or textured walls, if desired. The dovetail groove 40, however, is hidden from view when formed by closing the hinge 16 (that is, when the case is in the configuration shown in FIGS. 2 and 3). This geometry may reduce the risk of the membrane 22 tearing during operation of the hinge and may improve manufacturability by injection moulding, by improving material flow during the injection moulding process. The dovetail groove 40 is delimited by wedges, for example opposing wedges 42,44, which are cooperatively arranged to contact when the hinge is closed, spacing apart the edges 36,38 and setting the desired spread of the membrane 22 when the hinge is closed. This may provide for:

a flat and wrinkle free membrane when the hinge is closed; and may improve the mechanical stability of the case 10 when the hinge 16 is closed.

The case 10 comprises a body 50 comprising the first panel 12 and second panel 14, and a case perimeter wall 30. The perimeter wall comprises a first panel perimeter wall portion 64 at three of the four edges of the first panel 12, and running along those three edges of the first panel 12. The perimeter wall also comprises a second panel perimeter wall portion 66 that is attached to three of the four edges of the second panel 14, and running along those three edges of the second panel 14. The perimeter wall 30 is interrupted by a plurality of spaces, including spaces 52 and 54. Space 54 is a finger access port used to remove a stylus when received by stylus receiving space 32. In the context of the present application, the term stylus encompasses a hand-held tool used by a user to interact with a touch sensitive area (for example a touch sensitive screen) of the tablet shaped device. A stylus may, but not necessarily, comprise an elongated shaft having opposite ends and a touch sensitive area interaction point at at least one of the opposite ends. Each of the panels 12,14 optionally comprise stiffening members 31,33 comprising a plurality of elongate and inwardly turned panel members that define a rectangle. Space 54 is for locating therein a hinge 9 of the folding cover 2, enabling the keyboard 6 of the folding cover 2 to be folded into contact or out of contact of the electronic touch sensitive display 8 of the tablet shaped device 1.

The frontward facing opening of the tabled shaped device receiving space 20 is constricted by a resilient lip 34, shown in FIG. 7 for example, projecting inwardly from the rim of the perimeter wall 30. The tablet shaped device 1 may be inserted by squeezing it through the opening defined by the resilient lip 34. The at least one resilient lip 34 deforms to accommodate the passage of the tablet shaped device 1, and recoils back into shape subsequent to passage of the tablet shaped device 1. The perimeter wall 30 comprises user operable actuators 21,23 for operating volume and power controls of the tablet shaped device when received by the case 10. Perimeter wall 30 defines ports including port 25 for taking images with a camera of the tablet shaped device, ports 27,29 for sound, and may define a port for a power cable.

The inside surface of panels 12,14 comprises an optional inner lining in the form of an inner felt lining. The inner lining provides a relatively soft surface to reduce scratching of the tablet shaped device. Other embodiments may not have an inner lining or may have another suitable lining material.

A one or two step injection molding process may be used to fabricate the case 10. Case 10 comprises at least one polymer, in the present embodiment polycarbonate rear walls and a thermoplastic polyurethane perimeter. Other embodiments may comprise generally any suitable material, examples of which include metal, wood, and fiber reinforced plastic.

Now that embodiments have been described, it will be appreciated that some embodiments may have some of the following advantages:

A folding cover for a tablet shaped device with a keyboard can be attached to the tablet shaped device without taking the case 10 completely off the tablet shaped device.

Because there is no need to remove the case, the tablet shaped device is more likely to be in the case when bumped or dropped, for example, providing protection.

Even when a keyboard is coupled to the tablet shaped device, the case provides at least some protection for the tablet shaped device.

The hinge may be rip resistance.

The membrane hinge 16 may allow for a more compact case.

Variations and/or modifications may be made to the embodiments described without departing from the spirit or ambit of the invention. For example:

The hinge may separately attach the first panel 12 and the second panel 14. A removable hinge pin may be used, for example, which are received by hinge pin receivers of the first panel 12 and the second panel 14.

The rear of the panels 12,14 may be plain.

At least one of the panels 12,14 may have an aperture through the front face 18.

At least one of the ports 52,54 and any other port may be absent.

The stylus holder may be absent.

The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A tablet case for enclosing a tablet having a folding cover thereon, the folding cover on the tablet comprising a keyboard and a plurality of folding cover panels including a folding cover larger panel attached to a back side of the tablet and a folding cover smaller panel hingedly connecting to a lower margin of the folding cover larger panel, the folding cover larger panel hingedly connecting to an upper margin of the keyboard, the folding cover being unfoldable to a use position, wherein the keyboard is substantially horizontal and the tablet is upright with a screen viewable over the keyboard and the screen and keyboard defining an obtuse angle, and wherein the folding cover smaller panel, a lower portion of the tablet, and a forward portion of the keyboard defining a triangular shape;

the tablet case comprising a tablet case larger panel with a case perimeter wall that receives an upper portion of the tablet with the folding cover larger panel, the tablet case further comprising a tablet case smaller panel with a portion of the case perimeter wall, the tablet case smaller panel hingedly connected to the tablet case larger panel at a hinge, wherein when the folding cover and tablet are in a typing position the tablet case smaller panel accommodates the triangular shape defined by the folding cover smaller panel, the lower portion of the tablet, and a forward portion of the keyboard by bending at the hinge between the tablet case smaller panel and the tablet case larger panel and the tablet case does not need to be removed, wherein the smaller panel has a perimeter wall parallel to the hinge, the perimeter wall defining an opening for receiving therein a folding cover hinge hingedly connecting the folding cover larger panel and the folding cover smaller panel.

2. The tablet case of claim 1, wherein the tablet case and folding cover are foldable to a stowed position wherein the tablet case smaller panel and the tablet case larger panel are coplanar behind the tablet, the folding cover larger panel and folding cover smaller panel being sandwiched between the tablet and the tablet case.

3. The tablet case of claim 2, wherein the hinge between the tablet case larger panel and the tablet case smaller panel comprises a membrane hinge.

4. The tablet case of claim 3, wherein the membrane hinge between the tablet case larger panel and the tablet case smaller panel has a pair of key-hole shaped apertures at each of two ends thereof.

5. The tablet case of claim 1, wherein each of the smaller panel and the larger panel of the tablet case have the case perimeter wall on three sides thereof, wherein the opening is for unfolding the hinged keyboard.

6. The tablet case of claim 1, wherein the case perimeter wall on the tablet case larger panel comprises a user operable actuator for control of the tablet.

7. The tablet case of claim 1 in combination with the tablet having the folding cover.

8. The tablet case of claim 1, wherein the case perimeter wall on one of the three sides of the larger panel defines a stylus receiving space.

9. The tablet case of claim 8, wherein a portion of the perimeter wall surrounding the stylus receiving space defines a finger access port.

10. The tablet case of claim 1, wherein the case perimeter wall includes a resilient lip, the resilient lip projecting inwardly from a rim of the perimeter wall.

11. The tablet case of claim 10, wherein the resilient lip is configured to deform to accommodate insertion of the tablet, and wherein the resilient lip is configured to recoil subsequent to insertion of the tablet.

* * * * *